(12) United States Patent
Zhao

(10) Patent No.: US 10,767,077 B2
(45) Date of Patent: Sep. 8, 2020

(54) LOAD-BEARING MEMBER SURFACE TREATMENT

(71) Applicant: OTIS ELEVATOR COMPANY, Farmington, CT (US)

(72) Inventor: Chen Qian Zhao, Newark, DE (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/419,537

(22) Filed: Jan. 30, 2017

(65) Prior Publication Data
US 2018/0215946 A1 Aug. 2, 2018

(51) Int. Cl.
| | | |
|---|---|---|
| *C09D 175/04* | (2006.01) | |
| *C11D 11/00* | (2006.01) | |
| *C11D 3/20* | (2006.01) | |
| *C11D 3/37* | (2006.01) | |
| *B05D 7/00* | (2006.01) | |
| *B66B 7/12* | (2006.01) | |
| *B05D 3/12* | (2006.01) | |
| *B29B 15/12* | (2006.01) | |

(52) U.S. Cl.
CPC ............ *C09D 175/04* (2013.01); *B05D 3/12* (2013.01); *B05D 7/50* (2013.01); *B66B 7/1284* (2013.01); *C11D 3/2041* (2013.01); *C11D 3/2065* (2013.01); *C11D 3/2068* (2013.01); *C11D 3/37* (2013.01); *C11D 11/0035* (2013.01); *C11D 11/0041* (2013.01); *B29B 15/122* (2013.01)

(58) Field of Classification Search
CPC .......... C09D 175/04; B05D 3/12; B05D 7/50; C11D 9/002; C11D 9/04; C11D 9/005; C11D 9/007; C11D 1/008; C11D 1/66; C11D 3/16; C11D 3/30; C11D 3/33; C11D 3/43
See application file for complete search history.

(56) References Cited

U.S. PATENT DOCUMENTS

| | | | |
|---|---|---|---|
| 3,905,452 A | | 9/1975 | Schirmer |
| 4,077,896 A | * | 3/1978 | Bunegar ............ C11D 3/30 134/40 |
| 4,576,738 A | * | 3/1986 | Colodney ............ C11D 1/83 510/365 |
| 4,627,931 A | * | 12/1986 | Malik ............ C11D 3/43 510/109 |
| 4,772,415 A | | 9/1988 | Adone |
| 5,948,745 A | | 9/1999 | Cao et al. |
| 6,384,010 B1 | | 5/2002 | Wagers |
| 6,583,104 B1 | * | 6/2003 | Christensen ......... C11D 3/2068 134/38 |
| 6,800,141 B2 | | 10/2004 | Sachdev et al. |

(Continued)

FOREIGN PATENT DOCUMENTS

| | | |
|---|---|---|
| CN | 1432638 A | 7/2003 |
| CN | 104893848 A | 9/2015 |

(Continued)

*Primary Examiner* — Michael P Wieczorek
(74) *Attorney, Agent, or Firm* — Cantor Colburn LLP

(57) ABSTRACT

A method of surface treating a load-bearing member comprising a tension member and a polymer jacket around the tension member is disclosed. According to the method, a liquid composition including water, a water-soluble organic polyol or a water-soluble organic polymer, and a surfactant is applied to a surface of the polymer jacket.

17 Claims, 4 Drawing Sheets

(56) References Cited

U.S. PATENT DOCUMENTS

| | | | |
|---|---|---|---|
| 7,055,675 B2 | 6/2006 | Behymer et al. | |
| 7,176,174 B2 * | 2/2007 | Filippini | C09D 9/04 |
| | | | 510/201 |
| 7,348,302 B2 | 3/2008 | Smith | |
| 7,608,573 B1 | 10/2009 | Scheuing et al. | |
| 7,883,634 B2 * | 2/2011 | Thompson | B29C 59/02 |
| | | | 216/38 |
| 8,476,214 B2 | 7/2013 | Lynch et al. | |
| 8,512,481 B2 | 8/2013 | Rondon et al. | |
| 8,648,027 B2 | 2/2014 | Mitchell et al. | |
| 8,653,016 B2 | 2/2014 | Gessner et al. | |
| 8,722,605 B2 | 5/2014 | Wilson et al. | |
| 8,765,655 B2 * | 7/2014 | Yianakopoulos | C11D 1/72 |
| | | | 510/235 |
| 8,772,216 B2 | 7/2014 | Volont et al. | |
| 2003/0228991 A1 | 12/2003 | Johnson et al. | |
| 2005/0079984 A1 | 4/2005 | Miles | |
| 2006/0089286 A1 | 4/2006 | Chakrabarty et al. | |
| 2008/0296544 A1 | 12/2008 | Wesson et al. | |
| 2012/0135910 A1 | 5/2012 | Gross et al. | |
| 2013/0196893 A1 | 8/2013 | Busby et al. | |
| 2014/0135297 A1 | 5/2014 | Narayanan et al. | |
| 2015/0099683 A1 | 4/2015 | Rhodes | |

FOREIGN PATENT DOCUMENTS

| | | |
|---|---|---|
| CN | 106086909 A | 11/2016 |
| EP | 2245128 B1 | 3/2010 |
| JP | 2016117540 A | 6/2016 |
| WO | 2007133934 A1 | 11/2007 |
| WO | 2012082153 A1 | 5/2012 |

\* cited by examiner

LOAD-BEARING MEMBER SURFACE TREATMENT

BACKGROUND

This disclosure relates generally to load-bearing members and more specifically to surface treatment of load-bearing members.

Load-bearing members can be used in a wide variety of mechanical equipment and processes. One example of a use for load-bearing members is in transportation such as for elevator or escalator systems. Elevator systems typically include a cab and a counterweight that move within a hoistway to transport passengers or cargo to different landings within a building. A load-bearing member such as a cable or belt connects the cab and counterweight, and during operation the load-bearing moves over one or more sheaves mounted to the building structure as the cab and counterweight move to different positions.

A common configuration for load-bearing members includes a tension member core such as one or more steel cords and a polymer jacket disposed around the core. The cords act as the load supporting tension member, while the jacket holds the cords in a stable position relative to each other, and provides a frictional load path to provide traction for driving the belt. During operation of systems with load-bearing members, a surface of the load-bearing member may be in contact with another system component such as a sheave in an elevator system, and the friction characteristics between the load-bearing member surface and other system components can affect the load-bearing system performance.

BRIEF DESCRIPTION

In some embodiments, there is a method of surface treating a load-bearing member comprising a tension member and a polymer jacket around the tension member. According to the method, a liquid composition comprising water, a water-soluble organic polyol or a water-soluble organic polymer, and a surfactant is applied to a surface of the polymer jacket.

In some aspects of the above embodiments, the load-bearing member is disposed in a load-bearing system comprising a first load attached to a first end of the load-bearing member, a second load attached to a second end of the load-bearing member, and a sheave with which the polymer jacket is in movable contact between the first and second ends of the tension member. In some embodiments, the load-bearing system comprises an elevator system including an elevator car as the first load and an elevator counterweight as the second load.

In some embodiments, a method of making a load-bearing member comprises applying a fluid polymer composition to a tension member and solidifying the fluid polymer composition to form a polymer jacket around the tension member. A liquid composition comprising water, a water-soluble organic polyol or a water-soluble organic polymer, and a surfactant is applied to a surface of the polymer jacket.

In any one or combination of the foregoing embodiments, the polymer jacket is configured as a belt In some embodiments, a method of removing wax from a surface of a substrate comprises applying a liquid composition comprising water, a water-soluble organic polyol or a water-soluble organic polymer, and a surfactant to the surface of the substrate. In some embodiments, the wax can comprise C24-C60 organic compounds.

In some embodiments, the polymer jacket or the substrate can comprise a thermoplastic elastomer.

In any one or combination of the foregoing embodiments, the polymer jacket or the substrate comprises a polymer and an additive selected from a mold release agents, lubricants, plasticizers, antioxidants, UV stabilizers, friction modifiers, flame retardant, antistatic agent, antimicrobial agents, impact modifiers, or combinations comprising any of the foregoing.

In any one or combination of the foregoing embodiments, the polymer jacket or the substrate comprises a polyurethane, polyester, ethylene propylene diene elastomer, chloroprene, chlorosulfonyl polyethylene, ethylene vinyl acetate, polyamide, polypropylene, butyl rubber, acrylonitrile butadiene rubber, styrene butadiene rubber, acrylic elastomer, fluoroelastomer, silicone elastomer, polyolefin elastomer, styrene block and diene elastomer, natural rubber, or a combination comprising any of the foregoing.

In any one or combination of the foregoing embodiments, the polymer jacket or the substrate comprises thermoplastic polyurethane.

In any one or combination of the foregoing embodiments, the liquid composition further comprises an ionic strength booster. In some embodiments, the ionic strength booster can include sodium chloride, potassium chloride, sodium bromide, potassium bromide, or a combination comprising any of the foregoing.

In any one or combination of the foregoing embodiments, the liquid composition comprises:

5 wt. % to 95 wt. % water-soluble organic polyol or a water-soluble organic polymer;

2 wt. % to 50 wt. % water-soluble surfactant; and 0.1 wt. % to 20 wt. % ionic strength booster, each of the weight percentages based on the total weight of the liquid composition, with the balance of the liquid composition comprising water to a total of 100 wt. % of the liquid composition.

In any one or combination of the foregoing embodiments, the liquid composition comprises at least 10 wt. % of water-soluble organic polyol or a water-soluble organic polymer.

In any one or combination of the foregoing embodiments, the liquid composition comprises a nonionic surfactant.

In any one or combination of the foregoing embodiments, the liquid composition comprises a water-soluble organic polyol comprising C2-C60 organic compounds comprising 2 to 20 hydroxyl groups.

In any one or combination of the foregoing embodiments, the method further includes manual agitation of the liquid composition on the surface of the polymer jacket or substrate.

In any one or combination of the foregoing embodiments, the method further includes machine agitation of the liquid composition on the surface of the polymer jacket or substrate.

In any one or combination of the foregoing embodiments, the method further includes rinsing and wiping the surface of the polymer jacket or substrate to remove the liquid composition.

BRIEF DESCRIPTION OF THE DRAWINGS

Subject matter of this disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1A:
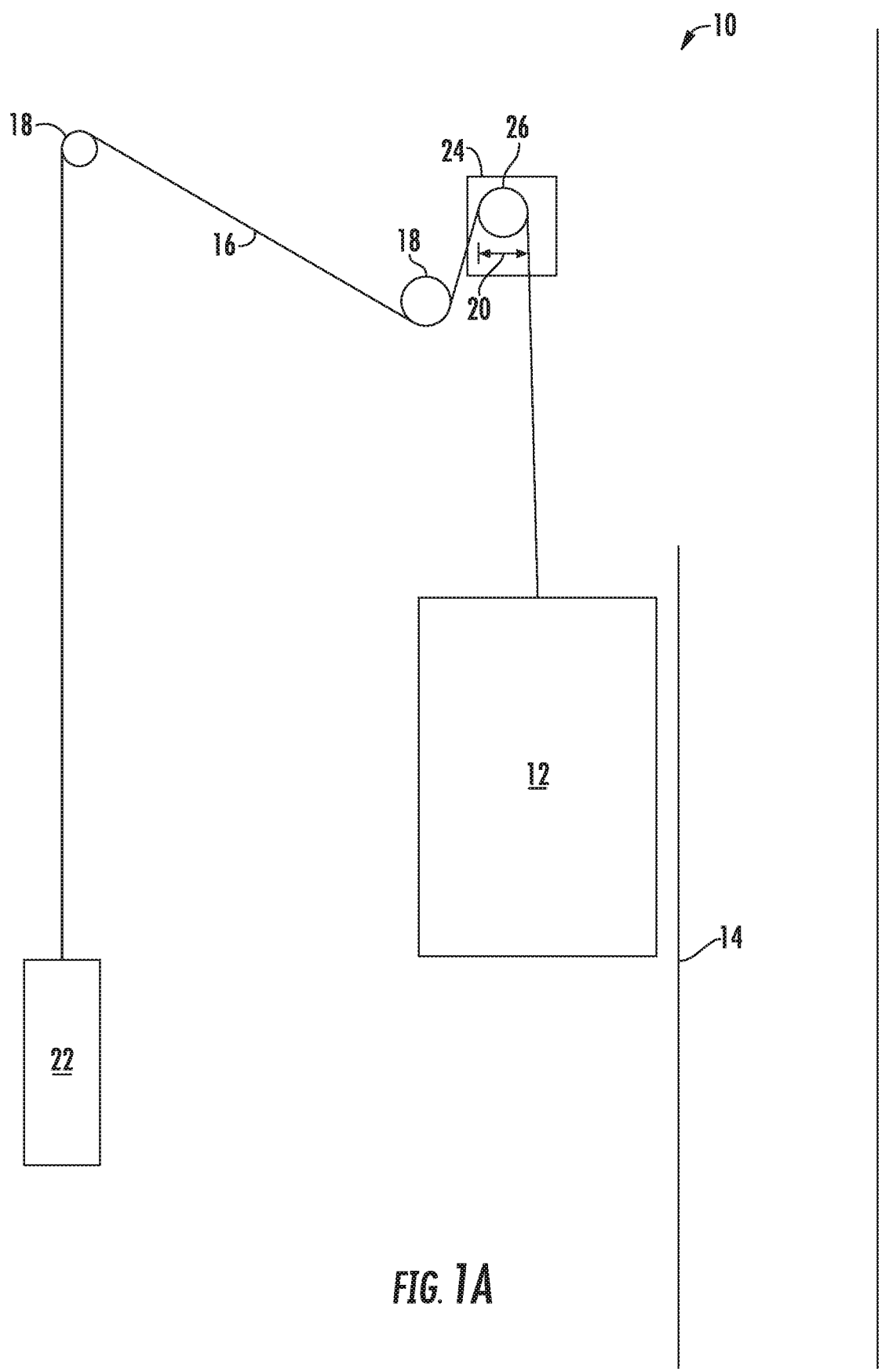
FIG. 1A is a schematic view of an exemplary embodiment of a traction elevator system.
Figure 1B:
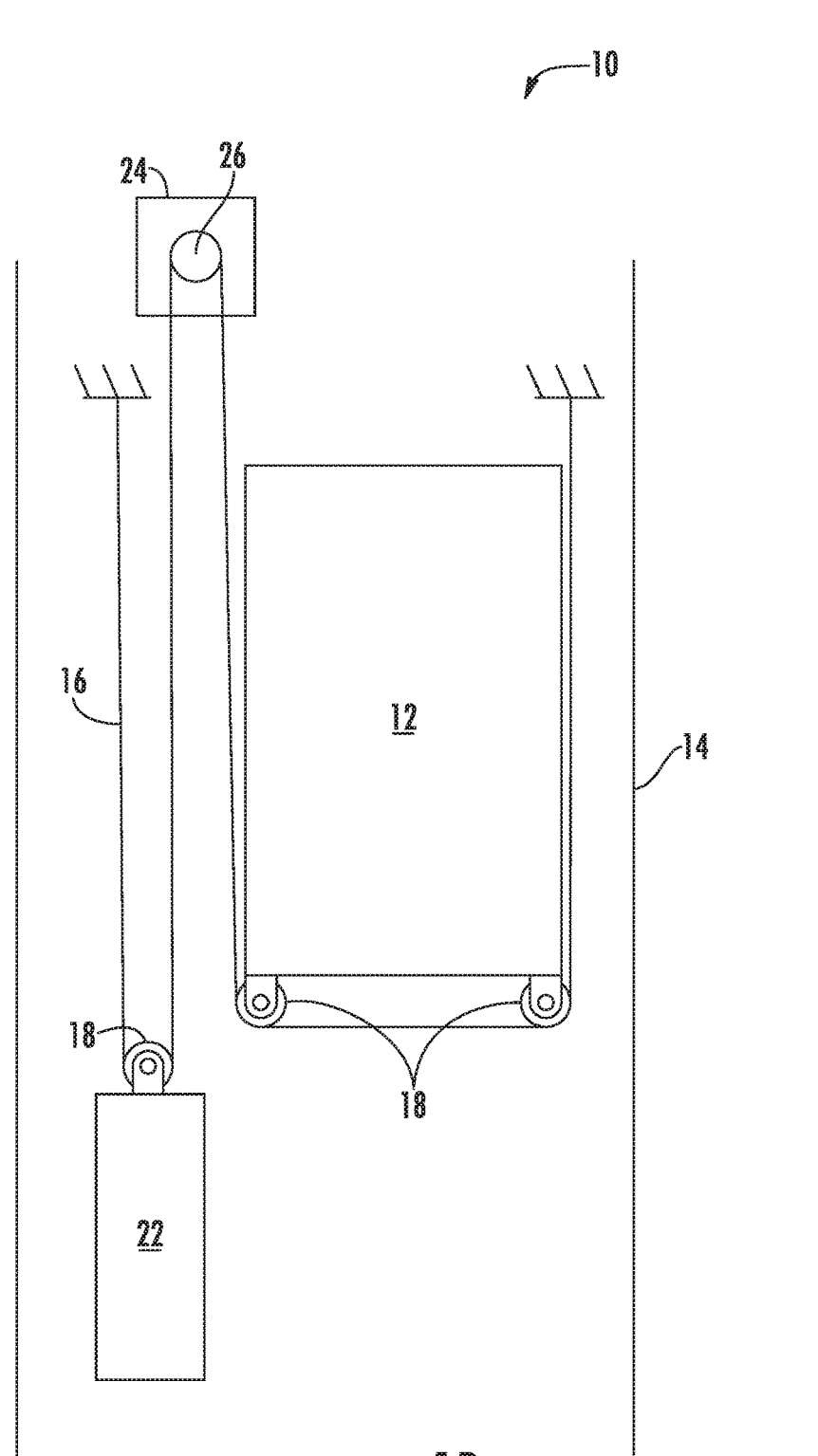
FIG. 1B is a schematic view of another exemplary embodiment of a traction elevator system.
Figure 1C:
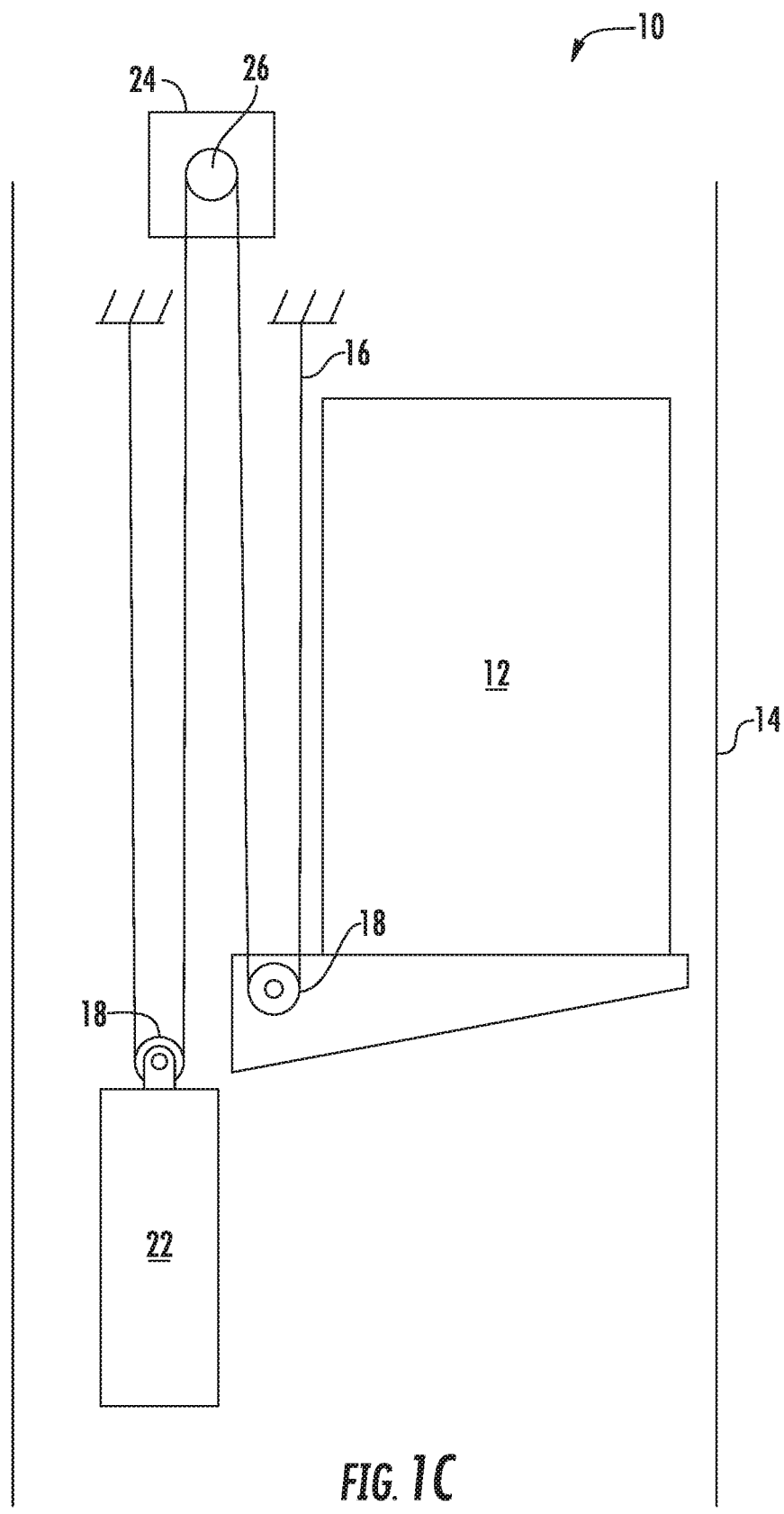
FIG. 1C is a schematic view of yet another embodiment of a traction elevator system.

Shown in FIGS. 1A, 1B and 1C are schematics of exemplary traction elevator systems 10. Features of the elevator system 10 that are not required for an understanding of the present invention (such as the guide rails, safeties, etc.) are not discussed herein. The elevator system 10 includes an elevator car 12 operatively suspended or supported in a hoistway 14 with one or more belts 16. The one or more belts 16 interact with one or more sheaves 18 to be routed around various components of the elevator system 10. The one or more belts 16 could also be connected to a counterweight 22, which is used to help balance the elevator system 10 and reduce the difference in belt tension on both sides of the traction sheave during operation.

The sheaves 18 each have a diameter 20, which may be the same or different than the diameters of the other sheaves 18 in the elevator system 10. At least one of the sheaves could be a drive sheave 26. The drive sheave 26 is driven by a machine 24. Movement of the drive sheave 26 by the machine 24 drives, moves and/or propels (through traction) the one or more belts 16 that are routed around the drive sheave 26. At least one of the sheaves 18 could be a diverter, deflector or idler sheave 18. Diverter, deflector or idler sheaves 18 are not driven by the machine 24, but help guide the one or more belts 16 around the various components of the elevator system 10.

In some embodiments, the elevator system 10 could use two or more belts 16 for suspending and/or driving the elevator car 12. In addition, the elevator system 10 could have various configurations such that either both sides of the one or more belts 16 engage the one or more sheaves 18 (such as shown in the exemplary elevator systems in FIG. 1A, 1B or 1C) or only one side of the one or more belts 16 engages the one or more sheaves 18.

FIG. 1A provides a 1:1 roping arrangement in which the one or more belts 16 terminate at the car 12 and counterweight 22. FIGS. 1B and 1C provide different roping arrangements. Specifically, FIGS. 1B and 1C show that the car 12 and/or the counterweight 22 can have one or more sheaves 18 thereon engaging the one or more belts 16 and the one or more belts 16 can terminate elsewhere, typically at a structure within the hoistway 14 (such as for a machine room-less elevator system) or within the machine room (for elevator systems utilizing a machine room. The number of sheaves 18 used in the arrangement determines the specific roping ratio (e.g. the 2:1 roping ratio shown in FIGS. 1B and 1C or a different ratio). One skilled in the art will readily appreciate that the configurations of the present disclosure could be used on elevator systems other than the exemplary types shown in FIGS. 1A, 1B, and 1C.

Figure 2A:
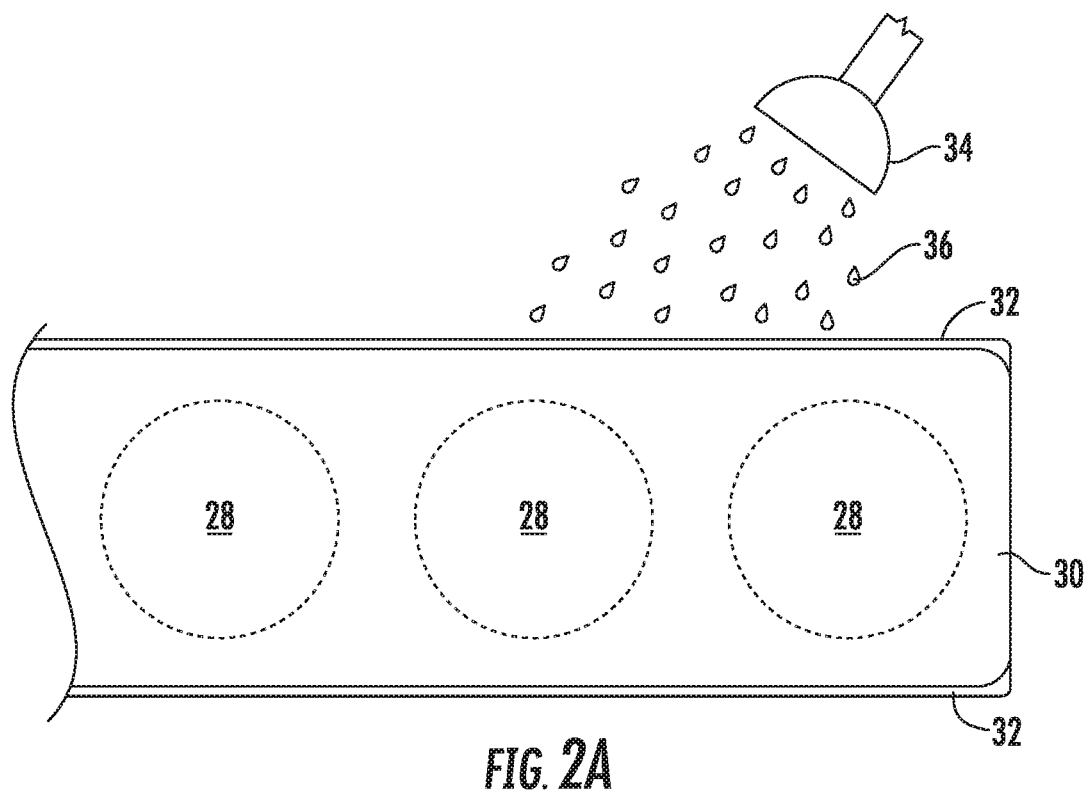
FIG. 2A is a schematic cross-sectional view of an embodiment of a belt for a traction elevator system before surface treatment.
Figure 2B:
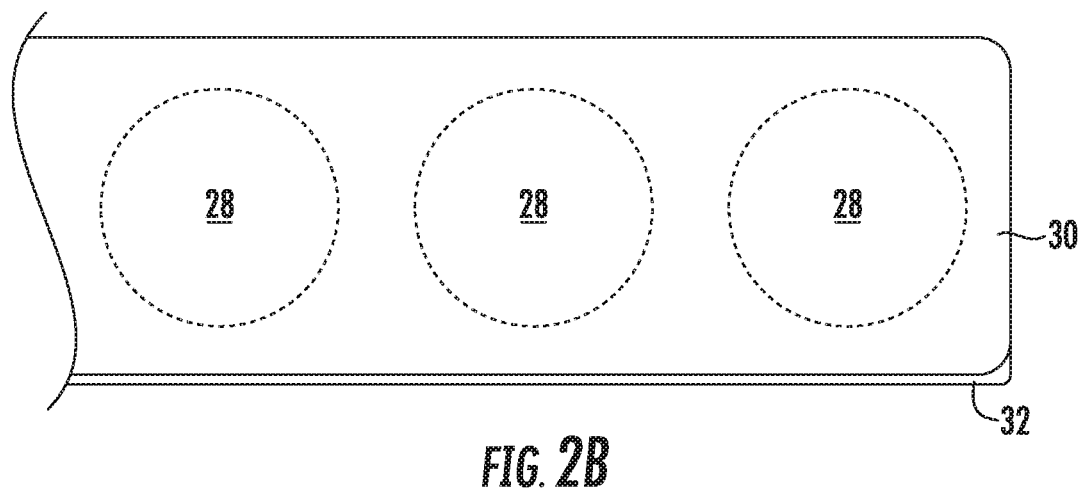
FIG. 2B is a schematic cross-sectional view of an embodiment of a belt for a traction elevator system after surface treatment.

Referring to FIGS. 2A and 2B, a cross-sectional view of an exemplary belt 16 is shown. The belt 16 is constructed of one or more tension member cords 28 in a jacket 30. The cords 28 of the belt 16 may all be identical, or some or all of the cords 28 used in the belt 16 could be different than the other cords 28. For example, one or more of the cords 28 could have a different construction, formed from different materials, or size than the other cords 28. As seen in FIGS. 2A and 2B, the belt 16 has an aspect ratio greater than one (i.e. belt width is greater than belt thickness). In some embodiments, each cord 28 comprises a plurality of wires such as steel wires, which in some embodiments are formed into strands 34, which are then formed into the cord 28. The belt 16 can be constructed to have sufficient flexibility when passing over the one or more sheaves 18 to provide low bending stresses, meet belt life requirements and have smooth operation, while being sufficiently strong to be capable of meeting strength requirements for suspending and/or driving the elevator car 12. The jacket 30 can substantially retain the cords 28 therein. The phrase substantially retain means that the jacket 30 has sufficient engagement with the cords 28 such that the cords 28 do not pull out of detach from, and/or cut through the jacket 30 during the application on the belt 16 of a load that can be encountered during use in an elevator system 10 with, potentially, an additional factor of safety. In other words, the cords 28 remain at their original positions relative to the jacket 30 during use in an elevator system 10. The jacket 30 could completely envelop the cords 28 (such as shown in FIGS. 2A and 2B), substantially envelop the cords 28, or at least partially envelop the cords 28. The jacket 30 can be formed from a polymer composition that is applied in a fluid state to the cords 28 and solidified. Polymer compositions can be converted from fluid to solid through various techniques such as heating and cooling of a thermoplastic polymer melt, through a cueing reaction of a thermoset polymer composition, or through fluidization with an organic solvent and removal of the solvent by evaporation. Examples of polymers that can be used in the polymer jacket include polyurethanes, polyesters, ethylene propylene diene elastomers, chloroprenes, chlorosulfonyl polyethylenes, ethylene vinyl acetates, polyamide, polypropylenes, butyl rubbers, acrylonitrile butadiene rubbers, styrene butadiene rubbers, acrylic elastomers, fluoroelastomers, silicone elastomers, polyolefin elastomers, styrene block and diene elastomers, natural rubber, or a combination comprising any of the foregoing. As mentioned above, in some embodiments, the jacket 30 can be formed from a thermoplastic elastomer. In some embodiments, the jacket comprises thermoplastic polyurethane (TPU).

With continued reference to FIGS. 2A and 2B, it has been discovered that a buildup of waxy material or wax 32 can form on the surface of the jacket 30. Although this disclosure is not bound by any particular mechanism or theory of operation, it is believed that in some embodiments the accumulation of waxy material on the surface of the jacket can be tied to the presence of additives in the polymer jacket. Previous attempts at removal of this wax have involved the use of organic solvents that are potentially flammable, have low flash points, are environmentally unfriendly, or any combination thereof, and in some embodiments the liquid composition is free of such organic solvents. In some embodiments, the liquid composition is free of alcohols (i.e., mono-alcohols including substituted mono-alcohols such as 2-butoxy-ethanol). Polymer additives of lower molecular weight may have a greater propensity for migration than additives of higher molecular weight. Examples of additives that may be subject to migration can include mold release agents, lubricants, plasticizers, antioxidants, UV stabilizers, friction modifiers, flame retardant, antistatic agent, antimicrobial agents, impact modifiers, or combinations comprising any of the foregoing (including combinations with one or more of each other or with other additives. In some embodiments, a wax to be subjected to surface treatment can include C24-C60 organic compounds, including but not limited to alkanes, substituted alkanes (e.g., alcohols), esters, acids, amides, low molecular weight polyolefins, or polysiloxane. In some embodiments, load-bearing members can be subject to adverse impact from wax accumulation when the load-bearing member has been operated at elevated temperatures (by "operated at", it is meant the ambient temperature of the space (e.g., air temperature) in which the load-bearing member is situated). In some embodiments, the load-bearing member has been operated at a temperature of at least 35° C. In some embodiments, the load-bearing member has been operated at a temperature of at least 40° C. In some embodiments, the load-bearing member has been operated at a temperature of at least 45° C. In some embodiments, the load-bearing member has been operated at a temperature of at least 50° C. Also included in the disclosure are methods of operating a tension member comprising subjecting the load-bearing member to a load and moving it along a sheave at a temperature of at least any of the above-specified temperatures, and surface treating the surface of the load-bearing member with the liquid composition as described herein.

As mentioned above, a liquid composition comprising water, a water-soluble organic polyol, and a surfactant can be applied to a surface of the jacket 30 as a surface treatment. As shown in FIG. 2A, a nozzle 34 dispenses the liquid composition 36 onto a surface of the jacket 30 with wax 32. The liquid composition can also be used to treat other substrates (including but not limited to other polymer substrates, metals, ceramics, glass, natural materials such as wood or mineral surfaces) with wax accumulation or deposits on the surface. The liquid composition includes a water-soluble organic polyol or a water-soluble polymer. In some embodiments, the liquid composition can include a water-soluble organic polyols comprising C2-C60 organic compounds comprising 2 to 20 hydroxyl groups. Examples of water-soluble organic polyols include alkylene glycols such as propylene glycol, ethylene glycol, or polyethylene glycol, glycerin, pentaerythritol, sucrose, or sucralose. Examples of water-soluble polymers include but are not limited to polyacrylic acid, polyvinyl alcohol, ethylene vinyl alcohol, polyacrylamide, dextran, glucose, polysaccharide, and others. In some embodiments, the liquid composition includes the water-soluble organic polyol or water-soluble polymer in an amount of at least 50 wt. %, based on the total weight of the liquid composition. In some embodiments, the liquid composition includes the water-soluble organic polyol or water-soluble polymer in an amount in a range with a low end of 5 wt. %, 10 wt. %, 15 wt. %, or 25 wt. %, and a high end of 95 wt. %, 75 wt. %, or 40 wt. %, based on the total weight of the liquid composition. All possible combinations of the above-mentioned range endpoints (excluding impossible combinations where a low endpoint would have a greater value than a high endpoint) are explicitly included herein as disclosed ranges. Additionally, the above ranges are of course subject to solubility limits of the specific polyol or water-soluble polymer in water.

As mentioned above, the liquid composition includes a surfactant. Surfactants can include ionic or non-ionic surfactants. Accordingly, in some embodiments the surfactant is an ionic surfactant. Ionic surfactants can include anionic surfactants, cationic surfactants, and partially or fully ionically balanced surfactants including amphoteric surfactants, ampholytic surfactants, and zwitterionic surfactants. Examples of surfactants can include various surfactant compounds known for use as detergents. Examples of anionic surfactants can include alkyl, alkyl ether, or alkylaryl sulfates (e.g., sodium lauryl sulfate, sodium lauryl ether sulfate), sulfonates (e.g., dioctyl sodium sulfosuccinate), or carboxylates. In some example embodiments, the one or more surfactants can be selected from the group consisting of a C10-C20 alkyl sulfate, a C10-C18 alkyl ether sulfate, a C11-C18 alkyl benzone sulfonate, a C10-C18 alkyl alkoxy carboxylates mid-chain branched alkyl sulfates, modified alkylenzene sulfonate, methyl ester sulfonate, or α-olefine sulfonate, and combinations including one or more of the foregoing. Examples of cationic surfactants can include quaternary ammonium surfactants of up to 26 carbon atoms, dimethyl hydroxyethyl quaternary ammonium surfactants, cationic ester surfactants, and amino surfactants such as amido propyldimethyl amine.

Examples of zwitterionic, ampholytic, or other partially or fully charge-balanced ionic surfactants include: derivatives of secondary and tertiary amines, derivatives of heterocyclic secondary and tertiary amines, or derivatives of quaternary ammonium, quaternary phosphonium or tertiary sulfonium compounds. Specific examples of zwitterionic surfactants include betaines such as alkyl dimethyl betaine and cocodimethyl amidopropyl betaine, C8 to C18 (for example from C12 to C18) amine oxides, or sulfo and hydroxy betaines such as N-alkyl-N,N-dimethylamino-1-propane sulfonate where the alkyl group can be C8 to C18. Non-limiting examples of ampholytic surfactants include: aliphatic derivatives of secondary or tertiary amines or aliphatic derivatives of heterocyclic secondary and tertiary amines, in which the aliphatic radical can be straight- or branched-chain of at least 8 carbon atoms, and which contain at least one contains an anionic water-solubilizing group such as carboxy, sulfonate, or sulfate.

In some embodiments, the surfactant is a nonionic surfactant. In some embodiments, a nonionic surfactant can promote interaction with wax accumulations found on lead-bearing member polymer jackets. Examples of nonionic surfactants include polyethylene glycol alkyl ethers such as octaethylene glycol monododecyl ether, or pentaethylene glycol monododecyl ether, polypropylene glycol alkyl ethers, polyethylene glycol alkylphenyl ethers such as polyethylene glycol octylphenyl ethers, glycerol alkyl esters such as glyceryl laurate, polyoxyethylene glycol sorbitan alkyl esters, sorbitan alkyl esters, cocamide monoethanolamine, or cocamide diethanolamine.

In some embodiments, the liquid composition includes the surfactant in an amount in a range with a low end of 2 wt. %, 5 wt. %, or 10 wt. %, and a high end of 50 wt. %, 35 wt. %, or 20 wt. %, based on the total weight of the liquid composition. All possible combinations of the above-mentioned range endpoints (excluding impossible combinations where a low endpoint would have a greater value than a high endpoint) are explicitly included herein as disclosed ranges.

In some embodiments, the liquid composition further comprises an ionic strength booster. Ionic strength boosters can be selected from among known ionic strength adjusters. Examples of ionic strength boosters include but are not limited to citric acid, sodium chloride, potassium chloride, sodium bromide, potassium bromide, and others. In some embodiments, the liquid composition includes an ionic strength booster in an amount in a range with a low end of 0.1 wt. %, 1 wt. %, or 3 wt. %, and a high end of 20 wt. %, 10 wt. %, or 5 wt. %, based on the total weight of the liquid composition. All possible combinations of the above-mentioned range endpoints (excluding impossible combinations where a low endpoint would have a greater value than a high endpoint) are explicitly included herein as disclosed ranges.

In some embodiments, the liquid composition can comprise:

5 wt. % to 95 wt. % water-soluble organic polyol or a water-soluble organic polymer;

2 wt. % to 50 wt. % water-soluble surfactant; and 0.1 wt. % to 20 wt. % ionic strength booster, each of the weight percentages based on the total weight of the liquid composition, with the balance of the liquid composition comprising water to a total of 100 wt. % of the liquid composition.

In some embodiments, the liquid composition can comprise:

15 wt. % to 75 wt. % water-soluble organic polyol or a water-soluble organic polymer;

5 wt. % to 35 wt. % water-soluble surfactant; and 1 wt. % to 10 wt. % ionic strength booster, each of the weight percentages based on the total weight of the liquid composition, with the balance of the liquid composition comprising water to a total of 100 wt. % of the liquid composition.

In some embodiments, the liquid composition can comprise:

25 wt. % to 40 wt. % water-soluble organic polyol or a water-soluble organic polymer;

10 wt. % to 20 wt. % water-soluble surfactant; and 3 wt. % to 5 wt. % ionic strength booster, each of the weight percentages based on the total weight of the liquid composition, with the balance of the liquid composition comprising water to a total of 100 wt. % of the liquid composition.

With reference again to FIG. 2A, in some embodiments, the liquid composition 36 dispensed onto the surface of the jacket 30 can be agitated to facilitate removal of the wax 32 from the surface. Agitation can include cloth wiping, mechanical brushing, air brushing, water brushing, and can be applied using hand-operated manual or automatic tools or can be applied with a mechanical cleaning machine. In some embodiments, the surface treatment can also include rinsing and/or wiping the surface of the polymer jacket to remove the liquid composition. Rinsing can be performed with water, which may contain additives. Wiping can be performed automatically or by a mechanical cleaning machine.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A method of surface treating a load-bearing member, comprising:

providing a load-bearing member comprising a tension member and a polymer jacket around the tension member;

applying a liquid composition to a surface of the polymer jacket, said liquid composition consisting of 5-95 wt. % of a water-soluble organic polyol or water-soluble polymer, 2-50 wt. % of a surfactant, optionally an ionic strength booster selected from the group consisting of sodium chloride, potassium chloride, sodium bromide, potassium bromide and combinations of the foregoing, and the balance of the liquid composition being water to a total of 100 wt. %, each of the weight percentages based on the total weight of the liquid composition, said weight percentages subject to the limitation that the water-soluble organic polyol or a water-soluble-organic polymer is present in an amount within a solubility limit of the water-soluble organic polyol or water-soluble organic polymer in water, wherein said water-soluble organic polyol or a water-soluble-organic polymer comprises propylene glycol, ethylene glycol, polyethylene glycol, glycerin, pentaerythritol, sucrose, sucralose, polyacrylic acid, polyvinyl alcohol, ethylene vinyl alcohol, polyacrylamide, dextran, glucose, or polysaccharide.

2. The method of claim 1, wherein the load-bearing member is disposed in a load-bearing system comprising a first load attached to a first end of the load-bearing member, a second load attached to a second end of the load-bearing member, and a sheave with which the polymer jacket is in movable contact between the first and second ends of the tension member.

3. The method of claim 2, wherein the load-bearing system comprises an elevator system including an elevator car as the first load and an elevator counterweight as the second load.

4. The method of claim 1, wherein the liquid composition is free of flammable organic solvent.

5. The method of claim 1, wherein the polymer jacket comprises a polymer and an additive selected from a mold release agents, lubricants, plasticizers, antioxidants, UV stabilizers, friction modifiers, flame retardant, antistatic agent, antimicrobial agents, impact modifiers, or combinations comprising any of the foregoing.

6. The method of claim 1, wherein the polymer jacket comprises polyurethane, polyester, ethylene propylene diene elastomer, chloroprene, chlorosulfonyl polyethylene, ethylene vinyl acetate, polyamide, polypropylene, butyl rubber, acrylonitrile butadiene rubber, styrene butadiene rubber, acrylic elastomer, fluoroelastomer, silicone elastomer, polyolefin elastomer, styrene block and diene elastomer, natural rubber, or a combination comprising any of the foregoing.

7. The method of claim 1, wherein the polymer jacket comprises thermoplastic polyurethane.

8. The method of claim 1, wherein the water-soluble organic polyol is present in an amount of at least 10 wt. %, subject to the limitation that the water-soluble organic polyol is present in an amount within a solubility limit of the water-soluble organic polyol or water-soluble organic polymer in water.

9. The method of claim 1, wherein the water-soluble organic polymer is present in an amount of at least 10 wt. %, subject to the limitation that the water-soluble organic polymer is present in an amount within a solubility limit of the water-soluble organic polyol or water-soluble organic polymer in water.

10. The method of claim 1, wherein the ionic strength booster is present.

11. The method of claim 1, further comprising agitation of the liquid composition on the surface of the polymer jacket.

12. The method of claim 1, wherein the water-soluble organic polyol or water-soluble organic polymer is present in an amount of at least 50 wt. %, subject to the limitation that the water-soluble organic polyol or a water-soluble-organic polymer is present in an amount within a solubility limit of the water-soluble organic polyol or water-soluble organic polymer in water.

13. The method of claim 1, further comprising rinsing and wiping the surface of the polymer jacket to remove the liquid composition.

14. The method of claim 1, wherein the liquid composition consists of:
   (a) 5-95 wt. % of the water-soluble organic polyol or a water-soluble organic polymer;
   (b) 2-50 wt. % of the surfactant;
   (c) 0.1-20 wt. % of the ionic strength booster; and
   (d) the balance of the liquid composition being water to a total of 100 wt. %;
   said weight percentages based on the total weight of the liquid composition, and subject to the limitation that the water-soluble organic polyol or a water-soluble-organic polymer is present in an amount within a solubility limit of the water-soluble organic polyol or water-soluble organic polymer in water.

15. A method of making a load-bearing member, comprising applying a fluid polymer composition to a tension member and solidifying the fluid polymer composition to form a polymer jacket around the tension member, and applying a liquid composition to a surface of the polymer jacket, said liquid composition consisting of 5-95 wt. % of a water-soluble organic polyol or water-soluble polymer, 2-50 wt. % of a surfactant, optionally an ionic strength booster selected from the group consisting of sodium chloride, potassium chloride, sodium bromide, potassium bromide and combinations of the foregoing, and the balance of the liquid composition being water to a total of 100 wt. %, each of the weight percentages based on the total weight of the liquid composition, said weight percentages subject to the limitation that the water-soluble organic polyol or a water-soluble-organic polymer is present in an amount within a solubility limit of the water-soluble organic polyol or water-soluble organic polymer in water, wherein said water-soluble organic polyol or a water-soluble-organic polymer comprises propylene glycol, ethylene glycol, polyethylene glycol, glycerin, pentaerythritol, sucrose, sucralose, polyacrylic acid, polyvinyl alcohol, ethylene vinyl alcohol, polyacrylamide, dextran, glucose, or polysaccharide.

16. A method of removing wax from a surface of a substrate, comprising applying a liquid composition to the surface of the substrate, said liquid composition consisting of 5-95 wt. % of a water-soluble organic polyol or water-soluble polymer, 2-50 wt. % of a surfactant, optionally an ionic strength booster selected from the group consisting of sodium chloride, potassium chloride, sodium bromide, potassium bromide and combinations of the foregoing, and the balance of the liquid composition being water to a total of 100 wt. %, each of the weight percentages based on the total weight of the liquid composition, said weight percentages subject to the limitation that the water-soluble organic polyol or a water-soluble-organic polymer is present in an amount within a solubility limit of the water-soluble organic polyol or water-soluble organic polymer in water, wherein said water-soluble organic polyol or a water-soluble-organic polymer comprises propylene glycol, ethylene glycol, polyethylene glycol, glycerin, pentaerythritol, sucrose, sucralose, polyacrylic acid, polyvinyl alcohol, ethylene vinyl alcohol, polyacrylamide, dextran, glucose, or polysaccharide.

17. The method of claim 16, wherein the wax comprises C24-C60 organic compounds.

* * * * *